United States Patent [19]

Sasson

[11] Patent Number: 4,654,697
[45] Date of Patent: Mar. 31, 1987

[54] VIDEO SIGNAL APPARATUS FOR PROCESSING A TIME-DIVISION-MULTIPLEX VIDEO SIGNAL HAVING A BUFFER SEGMENT

[75] Inventor: Steven J. Sasson, Springwater, N.Y.

[73] Assignee: Eastman Kodak Company, Rochester, N.Y.

[21] Appl. No.: 793,810

[22] Filed: Nov. 1, 1985

[51] Int. Cl.$^4$ ............................................. H04N 11/06
[52] U.S. Cl. ...................................... 358/12; 358/141
[58] Field of Search ...................... 358/11, 12, 13, 141, 358/318, 316, 315, 14; 360/32

[56] References Cited

U.S. PATENT DOCUMENTS

| | | | |
|---|---|---|---|
| 4,001,883 | 1/1977 | Strout et al. | 360/48 |
| 4,015,286 | 3/1977 | Russell | 358/13 |
| 4,084,181 | 4/1978 | Mita et al. | 358/12 |
| 4,240,102 | 12/1980 | Groeneweg | 358/11 |
| 4,335,393 | 6/1982 | Pearson | 358/4 |
| 4,473,850 | 9/1984 | Foerster et al. | 360/9.1 |

OTHER PUBLICATIONS

Electronics, 7/14/83—pp. 82-83.

Primary Examiner—James J. Groody
Assistant Examiner—David E. Harvey
Attorney, Agent, or Firm—William F. Noval

[57] ABSTRACT

Video signal apparatus processes a time-division-multiplex (TDM) video signal which has a buffer segment between luminance and chrominance component segments. The apparatus includes a circuit which provides to an output transmission path, a TDM video signal having a compressed luminance segment including a series of time-compressed samples of varying signal value representing the luminance component of a color video signal and a compressed chrominance segment including a series of time-compressed samples of varying signal value representing the chrominance component of the color video signal. A control controls the circuit to form a buffer segment between the luminance and chrominance segments. During the buffer segment, the signal value of the TDM signal is caused to change from the value of the last sample of one segment to the value of the first sample of the next segment by applying to the output transmission path the signal value of the first sample of the next segment.

6 Claims, 9 Drawing Figures

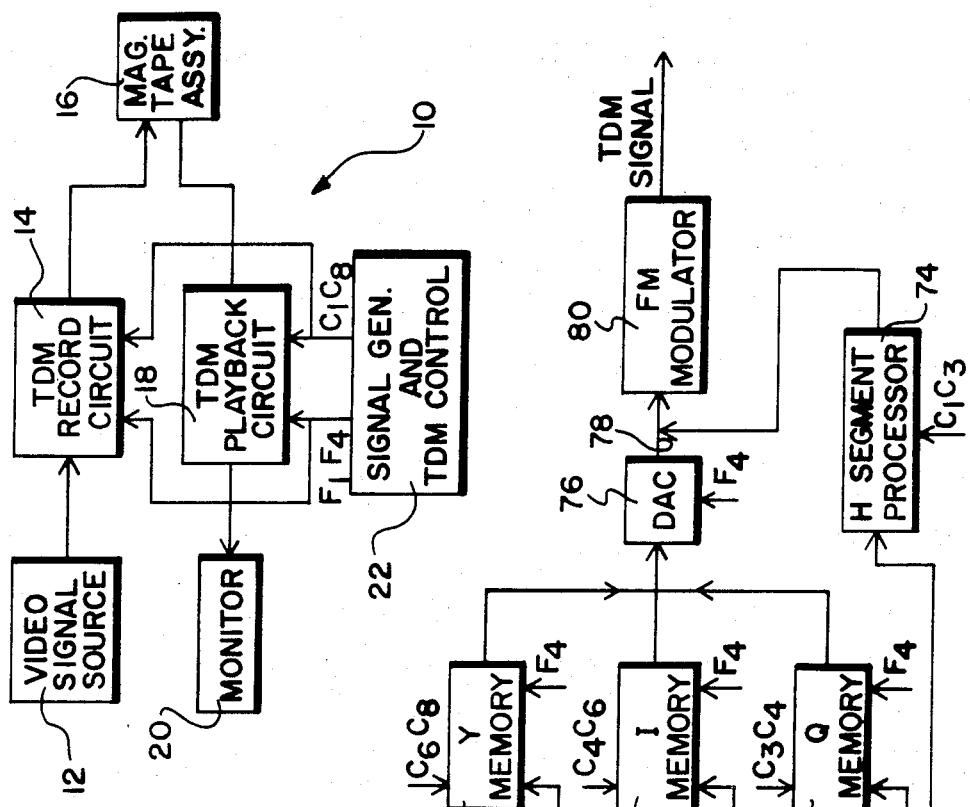
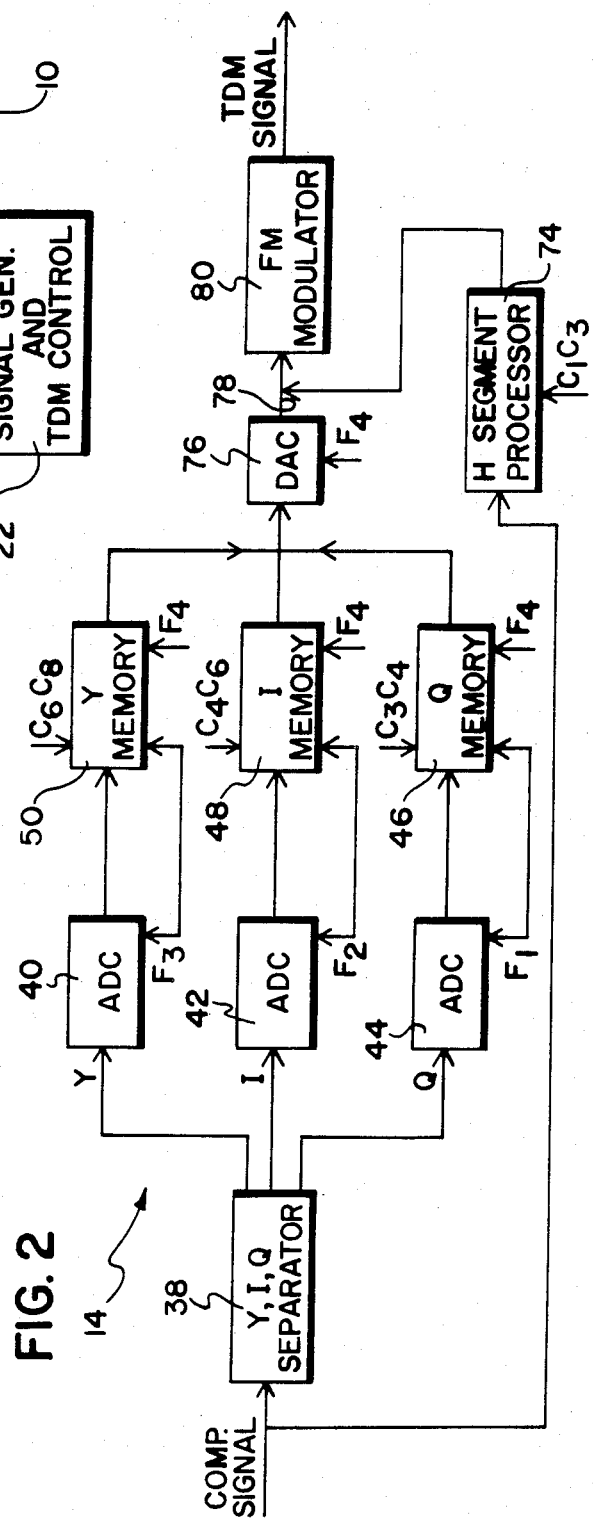
FIG. 1
FIG. 2

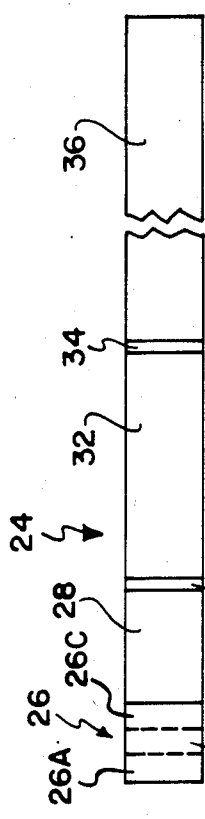
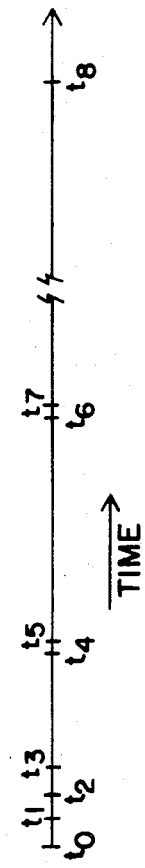
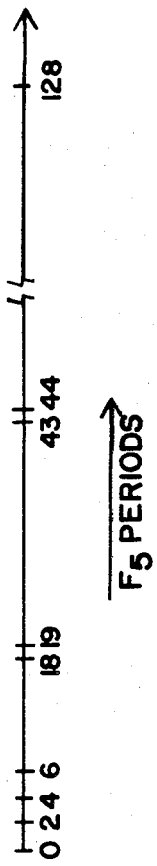
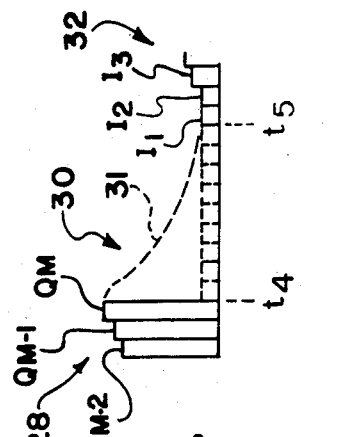
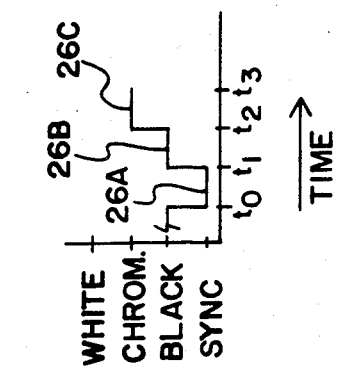

VIDEO SIGNAL APPARATUS FOR PROCESSING A TIME-DIVISION-MULTIPLEX VIDEO SIGNAL HAVING A BUFFER SEGMENT

BACKGROUND OF THE INVENTION

In general, this invention relates to video signal apparatus. More particularly, this invention relates to apparatus for processing time-divisionmultiplex video signals which have a buffer segment between video component segments.

Consumer video cassette recorders (VCR) typically use a "color-under" format to minimize color image problems which may result from the direct recording of a composite color video signal on magnetic tape. In the "color-under" format, the luminance component of the video signal is converted to an FM signal and the chrominance component is converted to a lower frequency signal outside of the frequency band of the FM luminance signal. The "color-under" format has several disadvantages. Thus, the resolution of the image is reduced due to reduction of the luminance bandwidth. In addition, color inaccuracies may result from the poor chrominance signal to noise ratio and from errors in the generation and regeneration of the standard composite color subcarrier signal.

In order to minimize these disadvantages of the "color-under" format, it has been proposed in U.S. Pat. No. 4,335,393, issued June 15, 1982, for "METHOD AND SYSTEM USING SEQUENTIALLY ENCODED COLOR AND LUMINANCE PROCESSING OF VIDEO TYPE SIGNALS TO IMPROVE PICTURE QUALITY", patentee G. J. Pearson, to reformat the concurrent luminance and chrominance components of a composite color video signal into a signal having compressed luminance and chrominance signals which are sequential in time to one another. The time sequential signal is then recorded on magnetic tape. This patent also discloses insertion of a mezzanine signal of fixed voltage level between the sequential chrominance and luminance components to serve as a dynamic reference for subsequent processing of the chrominance component. A somewhat similar technique is disclosed in U.S. Pat. No. 4,084,181, issued Apr. 11, 1978, for "APPARATUS FOR TRANSMISSION OF CHROMINANCE SIGNALS DURING BLANKING PERIOD", in which only the chrominance component signal is compressed in time and inserted during the horizontal blanking period. This patent also discloses insertion of fixed level buffers between the chrominance and luminance signals and between the chrominance and synchronizing signals to reduce crosstalk. In "NTT and NHK Home Systems for Sharp TV", ELECTRONICS, July 14, 1983, pages 82-3, there is disclosed a high definition color video signal in which the chrominance signal is compressed and transmitted sequentially in time relative to the luminance signal. A fixed level guard signal is inserted between the two signals.

In the transmission of a time-division-multiplex video signal over an analog transmission path, the limited response time of the analog path to large changes in signal value, may cause distortion of a sequentially transmitted component signal resulting in degradation and color changes in a reproduced image. Although, in each of the above systems a fixed level buffer is used to isolate components of the video signal processed by the system, the fixed level of the signal during the buffer does not always insure that the signal reaches an appropriate value before transmission or production of the next signal component.

SUMMARY OF THE INVENTION

According to the present invention, there is provided apparatus for processing a time-division-multiplex video signal in which the response time of an output transmission path to which the TDM signal is applied, is compensated for, during buffer segments between compressed component segments of the TDM signal. The TDM signal is thus transmitted along the path without distortion, resulting in a reproduced image which has not been degraded and the color of which is accurate. The TDM signal has first and second compressed segments each of which includes a series of time-compressed samples of varying signal value representing one or the other respectively of luminance and chrominance components of a color video signal. A buffer segment is formed between the first and second segments. During the buffer segment, the signal value of the TDM signal is caused to change from the signal value of the last sample of the first segment to the signal value of the first sample of the second segment, by applying to the output transmission path the signal value of the first sample of the second segment. Thus, the true signal value of the first sample of the second segment is applied to the path insuring accurate image reproduction and color rendition.

According to an aspect of the present invention, video signal apparatus includes circuit means for providing to an output transmission path a time-division-multiplex (TDM) video signal (1) having a first compressed segment including a series of time-compressed samples of varying signal value representing one of the luminance and chrominance components of a color video signal and (2) having a second compressed segment, sequential in time to said first segment, said second segment including a series of time compressed samples of varying signal value representing the other of luminance and chrominance components of said color video signal. The apparatus includes control means for controlling the circuit means to form a buffer segment between said first and second compressed segments and to apply the signal value of the first sample of the second segment to said output path during the buffer segment to cause the signal value of the TDM signal to change to the value of said first sample before application of said sample to said output path. In this manner, the response time of the output path is compensated for to permit distortion-free transmission of the samples of the second segment.

DESCRIPTION OF THE DRAWINGS

In the detailed description of the invention presented below, reference is made to the accompanying drawings in which like elements are numbered with like numbers.

FIG. 1 is a block diagram of video signal apparatus incorporating the present invention;

FIG. 2 is a block diagram of the TDM record circuit of the apparatus FIG. 1;

FIG. 5A is an illustrative diagram of a TDM video signal;

FIG. 5B and FIG. 5C are respectively general and specific timing diagrams for the TDM signal of FIG. 5A;

FIG. 6 is a signal value versus time diagram of the horizontal segment of the signal of FIG. 5A; and FIG. 7 is a diagram of a TDM buffer segment illustrating the present invention.

DESCRIPTION OF THE PREFERRED EMBODIMENT

Figure 3:
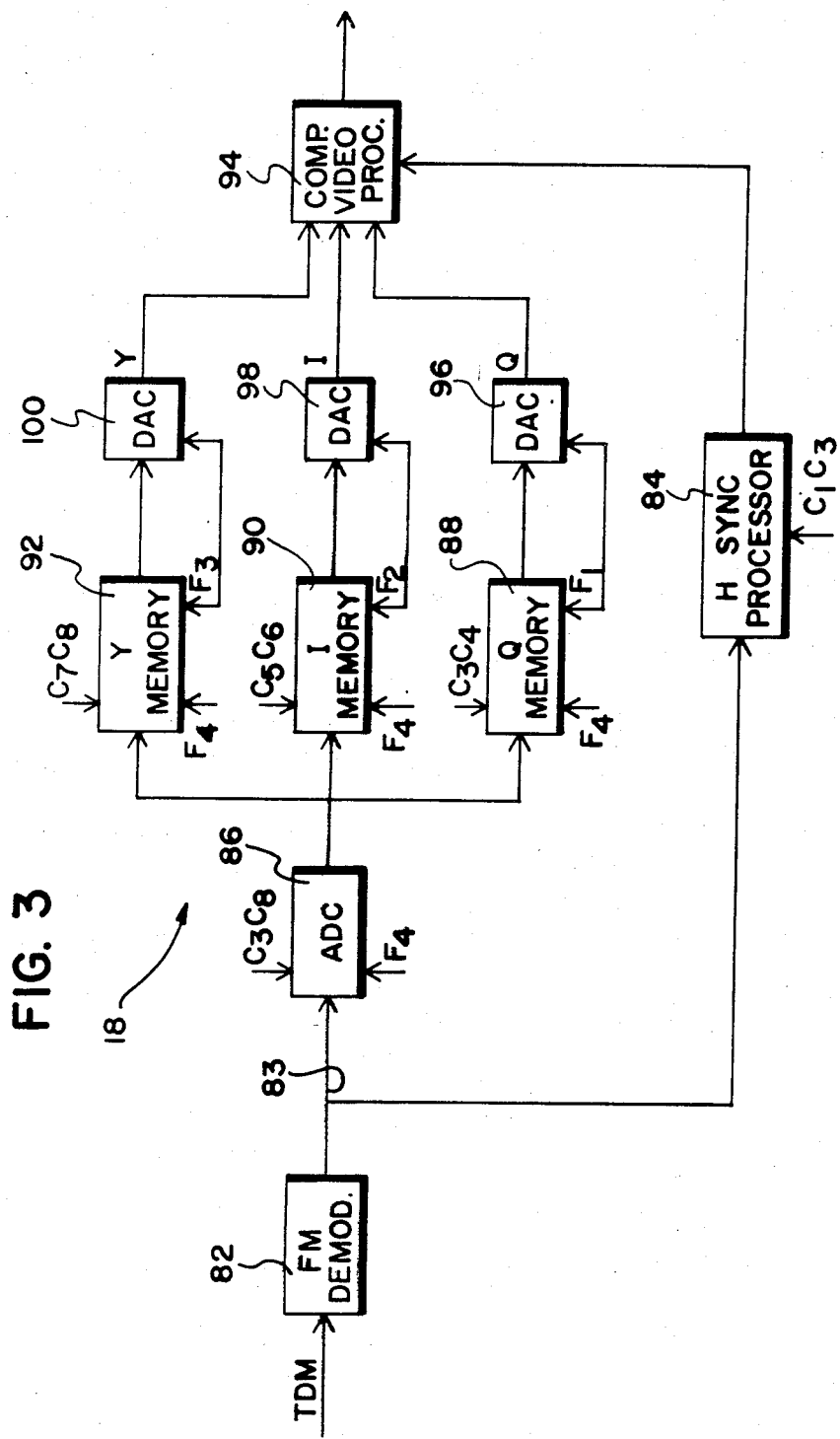
FIG. 3 is a block diagram of the TDM playback circuit of the apparatus of FIG. 1.

Referring now to FIG. 1, there is shown apparatus incorporating the time-division- multiplex video signal processing technique of the present invention. As shown, apparatus 10 includes a video signal source 12 which may for example be a color video camera or a transmission source such as a broadcast, satellite or cable transmission system. In the following description, it will be assumed that source 12 supplies a standard NTSC composite color video signal used in the U.S. It will be appreciated, however that other composite video signal systems such as the PAL and SECAM systems used in other parts of the world may also be processed in accordance with the present invention. It will also be appreciated that source 12 may provide component video signals such as a YIQ component video signal or an RGB component video signal. The color video signal is supplied to a TDM record circuit 14 which converts the NTSC composite color video signal into a TDM video signal which is recorded on magnetic tape by means of magnetic tape assembly 16. Assembly 16 may, for example, be of a type used in consumer video cassette recorders. In such VCRs a rotating magnetic head or heads records the video signal in magnetic tracks that are slanted across the width of tape contained in a cassette.

Apparatus 10 also includes TDM playback circuit 18 which receives signals from magnetic tape assembly 16 and converts the TDM video signal to a composite color video signal or component color video signal which is applied to monitor 20 for display of video images. A signal generator and TDM control 22 is also provided for providing frequency signals and control signals to circuits 14 and 18.

It will be appreciated that video signal source 12, circuits 14, 18, assembly 16, and circuit 22 may be combined into a lightweight camera/recorder for use in recording still and movie type image sequences.

It will be also appreciated that TDM record and playback circuits 14 and 18, magnetic tape assembly 16, and control 22 may be combined into a single apparatus which functions as a video cassette recorder/player or that TDM playback circuit 18, magnetic tape assembly 16, and control 22 may be combined into a single apparatus which only plays back prerecorded video cassettes. Other combinations will be apparent to those skilled in the art including the combining of the TDM signal processing circuit of circuits 14 and 18 with conventional signal processing circuits as disclosed in commonly-assigned copending U.S. patent application Ser. No. 725,873, by Carl Schauffele, entitled VIDEO REPRODUCTION APPARATUS, filed Apr. 22, 1985.

Referring now to FIG. 2, there is shown in greater detail TDM record circuit 14 of the apparatus of FIG. 1. In general, the function of circuit 14 is to convert a composite color video signal in which the luminance and chrominance components occupy concurrent, overlapping frequency bandwidths into a time-division-multiplex video signal in which the luminance and chrominance components are separated and transmitted in time sequential manner in order to avoid time base errors, image degradation and color inaccuracies which may result if the composite video signal was recorded on magnetic tape.

As shown in FIG. 5A, the TDM signal has a horizontal line duration (which in the NTSC system is equal to approximately 63.5 msec). The TDM signal includes a series of segments which are processed in a time sequential manner. In FIG. 5A, TDM signal 24 includes H sync segment 26, compressed Q chrominance segment 28, first buffer segment 30, compressed I chrominance segment 32, second buffer segment 34, and compressed Y luminance segment 36. Referring to FIGS. 6 and 5B, it will be seen that H sync segment 26 includes a compressed horizontal sync portion 26A which has a duration from time $t_0$ to $t_1$; a black level portion 26B which has a duration from $t_1$ to $t_2$ and a chrominance level portion 26C which has a duration from time $t_2$ to time $t_3$.

Q chrominance segment 28 has a duration from time $t_3$ to time $t_4$, first buffer segment 30 has a duration from $t_4$ to $t_5$, I chrominance segment 32 has a duration from $t_5$ to $t_6$, second buffer segment 34 has a duration from $t_6$ to $t_7$, and Y luminance segment 36 has a duration from $t_7$ to $t_8$ (FIGS. 5A and 5B).

As shown in FIG. 2, TDM record circuit 14 receives a composite color video signal from source 12 (FIG. 1). This signal is applied to YIQ separator 38 which separates the I and Q chrominance components from the Y luminance component and may, for example, include a comb filter and chrominance demodulator (not shown). The separated Y, I and Q analog signal components are respectively applied to analog-to-digital converters (ADC) 40, 42, and 44. ADC 44 samples the Q chrominance analog signal at a frequency $F_1$ and converts these analog samples to digital samples which are written into Q memory 46 at the $F_1$ sampling frequency. The I analog chrominance component is sampled at a frequency $F_2$ by ADC 42 and converted to digital samples which are stored in I memory 48 at the frequency of signal $F_2$. Finally, the Y luminance analog signal is sampled by ADC 40 at a frequency $F_3$ and converted to digital samples which are stored in Y memory 50 at the sampling frequency $F_3$. Frequencies $F_1$, $F_2$, and $F_3$ are chosen so as to be at least twice the highest frequency of each of the components sampled. As disclosed in the above described Schauffele U.S. patent application Ser. No. 725,873, the frequency $F_1$ may for example be chosen to be 2.013 MHz.; frequency $F_2$ may be chosen to have a frequency of 4.027 MHz and frequency $F_3$ may be chosen to be 14.097 MHz.

In order to produce a time-division-multiplex color video signal according to the present invention, the I and Q chrominance components and Y luminance component are compressed in time and rearranged in a time sequential fashion. A sampling frequency $F_4$ is chosen to effect production of the TDM signal during a single horizontal line period. Thus, frequency $F_4$ may be chosen at 18.125 MHz and this frequency is sequentially applied to Q memory 46, I memory 48 and Y memory 50 to produce the TDM signal. Timing of the TDM signal is simplified by chosing the TDM sampling frequency $F_4$ as a multiple of the horizontal frequency $F_H$. In this case, $F_4 = 1152 F_H$. Timing may be further simplified by making the durations of each of the TDM segments integrally divisible by the same number, in this case 9, so that timing may be effected by a slower, less costly, less complex timing circuit (see copending U.S.

patent application Ser. No. 793,820, filed Nov 11, 1985, entitled APPARATUS FOR PROCESSING A TIME-DIVISION-MULTIPLEX VIDEO SIGNAL HAVING SEGMENT DURATIONS DIVISIBLE BY A COMMON NUMBER).

Figure 4:
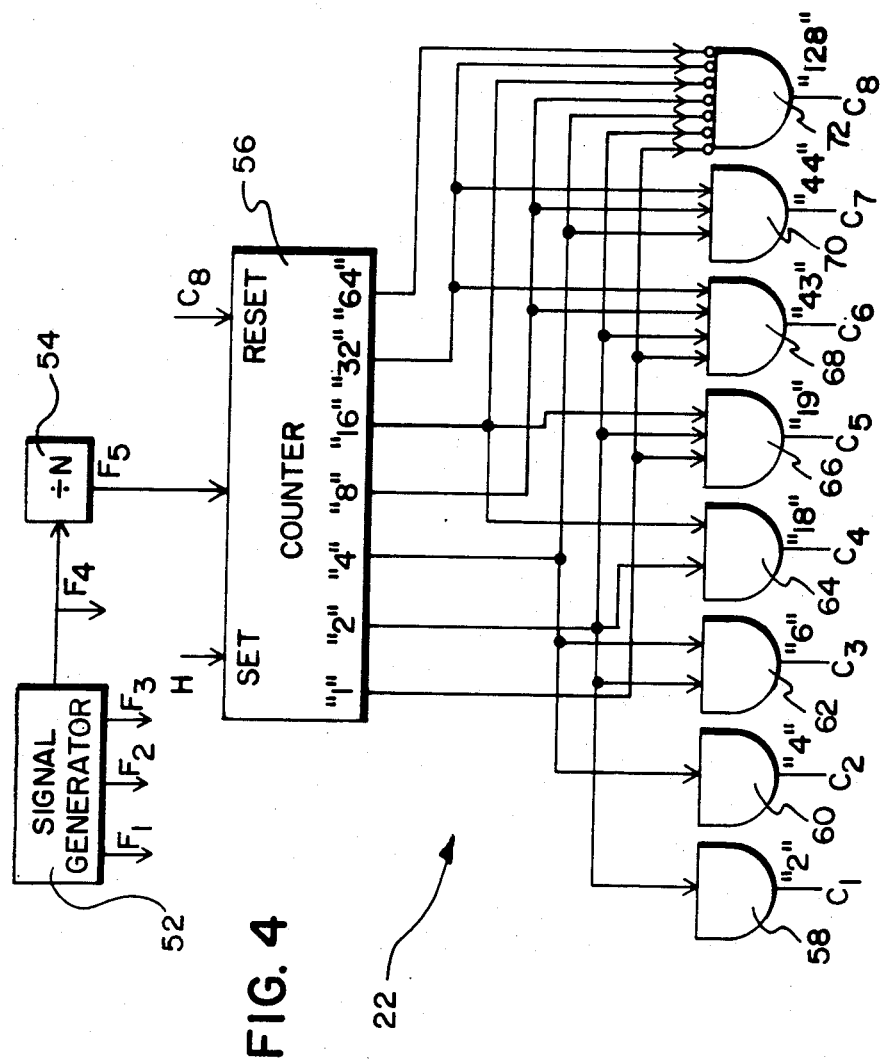
FIG. 4 is a block diagram of the signal generator and TDM control circuit of the apparatus of FIG. 1.

Signal generator and TDM control circuit 22 (FIG. 1) provides the timing for processing the TDM signal shown in FIG. 5A. As shown in FIG. 4, signal generator 52 (which may be of a type known to those skilled in the art) produces signals having frequencies $F_1$, $F_2$, $F_3$, and $F_4$. The $F_1$, $F_2$, and $F_3$ signals are respectively supplied to circuit 14 and, as described above, signal $F_4$ is also supplied to a divide by N circuit 54. In this example, N is 9 in order to produce a signal $F_5$ having a frequency which is 1/9 of the frequency of $F_4$. Since signal $F_4$ has a frequency equal to 1152 $F_H$, signal $F_5$ has a frequency equal to 1/9 of $F_4$ or 128 $F_H$. The timing of TDM segments is effected by counting the periods of signal $F_5$ by a seven-bit counter 56 having output terminals labeled "1", "2", "4", "8", "16", "32", and "64". The output of these terminals are selectively applied to AND gates 58, 60, 62, 64, 66, 68, 70, and 72 to produce respective control signals $C_1$, $C_2$, $C_3$, $C_4$, $C_5$, $C_6$, $C_7$, and $C_8$.

With reference to FIGS. 5A, 5B, and 5C, production of the TDM video signal is initiated at a suitable time $t_0$ which corresponds to the delayed leading edge of the horizontal sync pulse of the composite video signal. The TDM signal is applied to an output transmission path 78 such as wire, cable or the like. At time $t_0$, counter 56 begins counting pulses of frequency $F_5$, and H segment processor 74 initiates the production of segment 26. From time $t_0$ to time $t_1$ (count 0 to count 2), compressed sync portion 26A is produced; from time $t_1$ to $t_2$ (count 2 to count 4) black level portion 26B is produced; and from $t_2$ to $t_3$, (count 4 to count 6) chrominance level portion 26C is produced. Timing is effected by the control signals $C_1$, $C_2$ and $C_3$ applied to processor 74.

At time $t_3$ (count 6) control signal $C_3$ is also applied to Q memory 46 (FIG. 2) to initiate formation of Q segment 28 by reading out digital samples of the Q chrominance component at the time-compression sampling frequency $F_4$. DAC 76 converts the digital samples to analog samples and applies them in series to output path 76.

According to the present invention, a buffer segment 30 is formed between segments 28 and 32 in order to isolate these segments and to allow the TDM signal to change to an appropriate value to compensate for the response time of transmission path 78. If the response to large changes in signal value is insufficient, the first samples of the next TDM component segment may be distorted, resulting in image degradation and color inaccuracies in a reproduced image. The formation of buffer segment 30 is illustrated in FIG. 7. As shown, the last samples $Q_{n-2}$, $Q_{n-1}$, $Q_n$ of Q segment 28 are separated by buffer segment 30 from the first samples $I_1$, $I_2$, $I_3$, of I segment 32. FIG. 7 shows the signal values of the Q and I samples to be have voltage levels which would be produced after the digital signals read out of memories 46 and 48 (FIG. 2) are converted to analog signals by digital to analog converter (DAC) 76. After production of the last sample $Q_n$, production of the first sample $I_1$ is delayed from $t_4$ to $t_5$ while the buffer segment 30 is formed. During the buffer period, the signal value of the first I segment sample ($I_1$) is applied to transmission path 78 to cause the value of the TDM signal (dashed line 31) to change from the value of sample $Q_n$ to the value of sample $I_1$. Thus, during the time $t_4$ to $t_5$, the value (voltage) of the first sample $I_1$ is applied to path 78 without the actual production of this sample. The duration of buffer segment 30 is nine periods of signal $F_4$ or one period of signal $F_5$.

At time $t_5$, control signal $C_5$ terminates buffer segment 30 and initiates reading out of samples from I memory 48 to produce I segment 32. At time $t_6$ control signal $C_6$ terminates the reading out of samples from I memory 48 and applies the value of the first sample of the Y luminance signal to output path 78 during the duration of buffer segment 34. At time $t_7$, control signal $C_7$ initiates the reading out of Y samples from Y memory 50 to produce segment 36.

The TDM signal is modulated onto an FM carrier by FM modulator 80 (see FIG. 2) and the FM signal supplied to magnetic tape assembly 16 to be recorded on magnetic tape.

Referring now to FIG. 3, there is shown in greater detail TDM playback circuit 18. As shown, a TDM signal played back from magnetic tape by assembly 16 is supplied to FM demodulator 82 which demodulates the TDM signal. The first segment 26 of the TDM signal is applied to H sync processor 84 which samples the sync, black and chrominance levels of segment portions 26A, 26B, and 26C and produces a composite horizontal sync and blanking signal at an appropriate time. The chrominance level signal is also used to control the level of the I and Q chrominance components by means not shown. At time $t_3$, the Q chrominance segment 28 is sampled by analog-to-digital converter (ADC) 86 at the sampling frequency $F_4$ and written into Q memory 88. At $t_4$, the writing in of Q samples into memory 88 is terminated and during buffer segment 30 the transmission path 83 stabilizes. At $t_5$, control signal $C_5$ initiates reading into I memory 90, samples of I segment 32 at the frequency sampling rate of $F_4$. Reading into I memory is terminated at time $t_6$ by control signal $C_6$. Samples of Y segment 36 produced by ADC 86 are written into Y memory 92 from $t_7$ to $t_8$.

After an appropriate delay to allow reading into memories 88, 90, and 92 of the respective Q, I and Y samples, H sync processor 84 produces a composite horizontal sync and blanking signal which is applied to composite video processing circuit 94. At the start of the active video portion of the composite video signal, there is simultaneously read out from memories 88, 90, and 92 respective Q digital samples at frequency $F_1$, I digital samples at frequency $F_2$, and Y digital samples at frequency $F_3$. The respective digital samples are converted by digital to analog converters (DAC) 96, 98, and 100 into appropriate Q chrominance, I chrominance and Y luminance signals which are applied to composite video signal processing circuit 94 to produce a composite NTSC color video signal which is applied to monitor 20.

The invention has been described in detail with particular reference to preferred embodiments thereof, but it will be understood that variations and modifications can be effected within the spirit and scope of the invention.

What is claimed is:

1. Video signal apparatus comprising:
   an output transmission path;
   circuit means for providing to said transmission path a time-division-multiplex (TDM) video signal having a first compressed segment including a series of time-compressed samples of varying signal value representing one of two components of a video signal and a second compressed segment, sequential in time to said first compressed segment, said second segment including a series of time-compressed samples of varying signal value representing the other of said two components of said video signal; and control means for controlling said circuit means to form a buffer segment between said first and second compressed segments such that during said buffer segment, the signal value of the TDM signal is caused to change from the value of the last sample of said first segment to the value of the first sample of said second segment by applying to the output transmission path, during said buffer segment, the signal value of the first sample of said second segment.

2. The apparatus of claim 1 wherein said samples of said first compressed segment represent one of the chrominance and luminance components of a color video signal and have varying signal voltages, wherein said samples of said second compressed segment represent the other of the chrominance and luminance components of said color video signal and have varying signal voltages and wherein during said buffer segment, the voltage of the first sample of said second compressed segment is applied to said output transmission path.

3. Video signal apparatus comprising:
an output transmission path;
circuit means, coupled to said output transmission path, for processing a color video signal having a luminance component and two chrominance components to produce a time-division-multiplex (TDM) video signal having (1) a first compressed segment including a series of time-compressed samples of varying signal value representing one of said luminance and said two chrominance components of said color video signal; (2) a second compressed segment including a series of time compressed samples of varying signal value representing another of said luminance and said two chrominance components of said color video signal; and (3) a third compressed segment including a series of time compressed samples of varying signal value representing the last of said luminance and said two chrominance components of said color video signal; and control means for controlling said circuit means (1) to form a buffer segment between said first and second compressed segments such that during said buffer segment, the signal value of said TDM signal is caused to change from the value of the last sample of said first segment to the value of the first sample of said second segment by applying to the output transmission path the signal value of the first sample of said second segment, and (2) to form a buffer segment between said second and third compressed segments such that during said buffer segment, the signal value of said TDM signal is caused to change from the value of the last sample of said second segment to the value of the first sample of the third segment by applying to the output transmission path the signal value of the first sample of said third segment.

4. The apparatus of claim 3 wherein the varying signal values of said samples of said first second and third compressed segments are varying signal voltage values, wherein, during said buffer segment between said first and second compressed segments, the voltage of the first sample of said second segment is applied to said output transmission path, and wherein, during said buffer segment between said second and third compressed segments, the voltage of the first sample of said third segment is applied to said output transmission path.

5. The apparatus of claim 3 including means for recording said TDM video signal on recording media.

6. The apparatus of claim 5 wherein said recording means is a magnetic tape recorder and wherein said TDM video signal is recorded on magnetic tape.

* * * * *